United States Patent
Tsuchiya et al.

(10) Patent No.: US 6,530,968 B2
(45) Date of Patent: Mar. 11, 2003

(54) CHEMICAL MECHANICAL POLISHING SLURRY

(75) Inventors: Yasuaki Tsuchiya, Tokyo (JP); Tomoko Wake, Tokyo (JP); Tetsuyuki Itakura, Tokyo (JP); Shin Sakurai, Tokyo (JP); Kenichi Aoyagi, Tokyo (JP)

(73) Assignees: NEC Electronics Corporation, Kanagawa (JP); Tokyo Magnetic Printing Co., Ltd., Tokyo (JP)

( * ) Notice: Subject to any disclaimer, the term of this patent is extended or adjusted under 35 U.S.C. 154(b) by 0 days.

(21) Appl. No.: 09/989,021

(22) Filed: Nov. 20, 2001

(65) Prior Publication Data

US 2002/0095872 A1 Jul. 25, 2002

(30) Foreign Application Priority Data

Nov. 24, 2000 (JP) ........................................ 2000-357795

(51) Int. Cl.$^7$ .............................. C09G 1/02; C09G 1/04
(52) U.S. Cl. ............................. 51/307; 51/308; 51/309; 106/3; 106/5; 216/89
(58) Field of Search .......................... 51/307, 308, 309; 106/3, 5; 252/79.1, 79.4; 438/692, 693; 216/89; 510/397, 398, 418, 426, 434

(56) References Cited

U.S. PATENT DOCUMENTS

| | | | | |
|---|---|---|---|---|
| 4,561,993 A | * | 12/1985 | Choy et al. | ..................... 134/3 |
| 4,676,920 A | * | 6/1987 | Culshaw | ..................... 510/239 |
| 4,911,857 A | * | 3/1990 | Machin et al. | ............... 510/108 |
| 5,266,088 A | * | 11/1993 | Sandusky et al. | ............... 106/8 |
| 5,286,405 A | * | 2/1994 | Rennie et al. | ............... 510/243 |
| 5,783,489 A | * | 7/1998 | Kaufman et al. | ............... 106/3 |
| 5,814,113 A | * | 9/1998 | Neuland | ..................... 106/3 |
| 5,962,074 A | * | 10/1999 | Wollner | ..................... 427/322 |
| 6,132,637 A | * | 10/2000 | Hosali et al. | ............... 252/79.1 |
| 6,149,830 A | * | 11/2000 | Lin et al. | ..................... 216/89 |
| 6,258,140 B1 | * | 7/2001 | Shemo et al. | ................... 106/3 |

FOREIGN PATENT DOCUMENTS

| | | |
|---|---|---|
| JP | 8-83780 | 3/1996 |
| JP | 11-307484 | 11/1999 |
| JP | 2000-160137 | 6/2000 |
| JP | 2000-169831 | 6/2000 |

* cited by examiner

*Primary Examiner*—Michael Marcheschi
(74) *Attorney, Agent, or Firm*—Dickstein, Shapiro, Morin & Oshinsky, LLP

(57) ABSTRACT

This invention provides a chemical mechanical polishing slurry for polishing a metal film formed on an insulating film with a concave on a substrate wherein the slurry contains a thickener without an ionic group with an opposite sign to a charge on a polishing material surface to 0.001 wt % or more and less than 0.05 wt % to the total amount of the slurry and has a slurry viscosity of 1 mPa·s to 5 mPa·s both inclusive. The polishing slurry may be used in CMP to form a reliable damascene electric connection with excellent electric properties at a higher polishing rate, i.e., a higher throughput while preventing dishing or erosion.

19 Claims, 2 Drawing Sheets

CHEMICAL MECHANICAL POLISHING SLURRY

TECHNICAL FIELD

The present invention relates to a chemical mechanical polishing slurry. In particular, it relates to a chemical mechanical polishing slurry suitable as a polishing liquid used during forming a damascene metal interconnect in manufacturing a semiconductor device.

BACKGROUND OF THE INVENTION

With regard to forming a semiconductor integrated circuit such as ULSI which has been significantly refined and compacted recently, copper has been expected to be a useful material for electric connection because of its good electromigration resistance and lower electrical resistance.

To date a copper interconnect is as follows, due to problems such as difficulty in patterning by dry etching. Specifically, a concave such as a trench and a connection hole is formed in an insulating film, a barrier metal film is formed on the surface, a copper film is deposited by plating such that the concave is filled with the material, and then the surface is polished to be flat by chemical mechanical polishing (hereinafter, referred to as "CMP") until the surface of the insulating film except the concave area is completely exposed, to form electric connections such as a damascene interconnect in which the concave is filled with copper, a via plug and a contact plug.

There will be described a process for forming a damascene copper interconnect with reference to FIG. 1.

On a silicon substrate on which a semiconductor device has been formed (not shown) is formed a lower interconnect layer 1 consisting of an insulating film comprising a lower interconnect (not shown). Then, as shown in FIG. 1(a), on the silicon substrate are sequentially formed a silicon nitride film 2 and a silicon oxide film 3. On the silicon oxide film 3 is formed a concave having an interconnect pattern and reaching the silicon nitride film 2.

Then, as shown in FIG. 1(b), a barrier metal film 4 is formed by sputtering. On the film is formed a copper film 5 over all the surface by plating such that the concave is filled with the material.

As shown in FIG. 1(c), the copper film 5 is polished by CMP to make the substrate surface flat. Polishing by CMP is continued until the metal over the silicon oxide film 3 is completely removed, as shown in FIG. 1(d).

In the above process for forming a damascene metal interconnect, a barrier metal film made of, for example, a tantalum metal such as Ta and TaN is formed as a base film for, e.g., preventing diffusion of a conductive metal such as copper into the insulating film. However, when simultaneously polishing such different materials, a polishing rate for the barrier metal film is significantly smaller than that for the conductive metal (e.g., copper) film. Specifically, when forming a damascene metal interconnect by CMP using a conventional polishing slurry, there is a significant difference between the polishing rates for the conductive metal film and the barrier metal film, which may cause dishing and erosion.

Dishing is a phenomenon that the conductive metal (e.g., copper) film in the concave is excessively polished so that the center of the metal film in the concave is depressed in relation to the plane of the insulating film on the substrate, as shown in FIG. 2. An adequately much polishing time is required for completely removing the barrier metal film 4 on the insulating film (silicon oxide film 3) because of a lower polishing rate for the barrier metal film. The polishing rate for the copper film is, however, higher than that for the barrier metal film, so that the copper film is excessively polished, resulting in dishing.

Erosion is a phenomenon that polishing in a dense interconnect area excessively proceeds in relation to that in a sparse area such as an isolated interconnect area so that the surface of the dense interconnect area becomes depressed in relation to the other surfaces, as shown in FIG. 1(d). When the dense interconnect area comprising many damascenes in the copper film 5 is considerably separated from the isolated interconnect area comprising less damascenes in the copper film 5 by, for example, an area without interconnects within the wafer, and the copper film 5 is polished faster than the barrier metal film 4 or the silicon oxide film 3 (insulating film), then a polishing pad pressure to the barrier metal film 4 or the silicon oxide film 3 in the dense interconnect area becomes higher than that in the isolated interconnect area. As a result, in the CMP process after exposing the barrier metal film 4 (the process of FIG. 1(c) and thereafter), there generates a difference in a polishing rate by CMP between the dense interconnect area and the isolated interconnect area, so that the insulating film in the dense interconnect area is excessively polished, resulting in erosion.

Dishing in the process for forming an electric connection in a semiconductor device as described above, may cause increase in an interconnection resistance and a connection resistance, and tends to cause electromigration, leading to poor reliability in the device. Erosion may adversely affect flatness in the substrate surface, which becomes more prominent in a multilayer structure, causing problems such as increase and dispersion in an interconnect resistance.

JP-A 8-83780 has described that dishing in a CMP process may be prevented by using a polishing slurry containing benzotriazole or its derivative and forming a protective film on a copper surface. JP-A 11-238709 has also described that a triazole derivative is contained in a CMP slurry for improving flatness in polishing copper. The technique, however, controls dishing by reducing a polishing rate for a copper film so that polishing of the copper film takes a longer time, leading to a lower throughput.

On the other hand, there has been disclosed a technique attempting to improve polishing property of a slurry by adjusting a viscosity of the polishing slurry.

JP-A 2001-169831 has described the use of a slurry composition comprising a non-reactive polyol as a thickener selected from the group consisting of glycerin and polyethylene glycol in order to prevent dishing in CMP. The slurry composition contains the thickener to 0.1 to 50 vol % to adjust a slurry viscosity to 3.4 to 12 cps (mPa·s).

JP-A 11-307484 has described the use of a polishing liquid exhibiting Bingham fluidity which comprises a carboxyvinyl polymer in order to prevent dishing in CMP. For a viscosity of the polishing liquid, a specific range has not been described, but a polishing liquid containing the carboxyvinyl polymer to 0.1 wt % has been exemplified.

JP-A 2000-160137 has described a polishing liquid for CMP, but not for metal polishing, comprising cerium oxide particles, water and an anionic surfactant which can be applied to shallow trench separation. The polishing liquid is prepared such that a polishing rate ratio is large between a silicon oxide film and a silicon nitride film. There has been described that a viscosity of the polishing liquid is preferably 1.0 to 2.5 mPa·s.

It has been, however, difficult to conduct CMP at a higher polishing rate while preventing dishing, only by adjusting a viscosity of a polishing slurry as is in the prior art.

SUMMARY OF THE INVENTION

An objective of this invention is to provide a chemical mechanical polishing slurry whereby a reliable damascene electric connection with excellent electric properties can be formed at a higher polishing rate, i.e., with a higher throughput, while preventing dishing, in polishing a metal film formed on an insulating film with a concave on a substrate.

This invention provides a chemical mechanical polishing slurry for polishing a metal film formed on an insulating film with a concave on a substrate wherein the slurry contains a thickener without an ionic group with an opposite sign to a charge on a polishing material surface to 0.001 wt % or more and less than 0.05 wt % to the total amount of the slurry and has a slurry viscosity of 1 mPa·s to 5 mPa·s both inclusive.

A chemical mechanical polishing slurry of this invention (hereinafter, referred to as a "polishing slurry") may be suitably used in polishing a metal film formed on an insulating film with a concave on a substrate by CMP.

The slurry may be effectively used in a process for forming a barrier metal film as a base film on an insulating film with a concave; forming a conductive metal film on the barrier metal film such that the concave is filled with the conductive metal film; and polishing by CMP the substrate to flatten the substrate surface until the barrier metal film or the insulating film is exposed so that an electric connection such as a damascene interconnect where the concave is filled with a conductive metal, a plug and a contact is formed. The slurry is more effective when the conductive metal is a copper-based metal and the barrier metal is a tantalum-based metal.

A polishing slurry of this invention may be used in CMP to form a reliable damascene electric connection with excellent electric properties at a higher polishing rate, i.e., a higher throughput while preventing dishing or erosion.

DETAILED DESCRIPTION OF THE EMBODIMENTS

Figure 1:
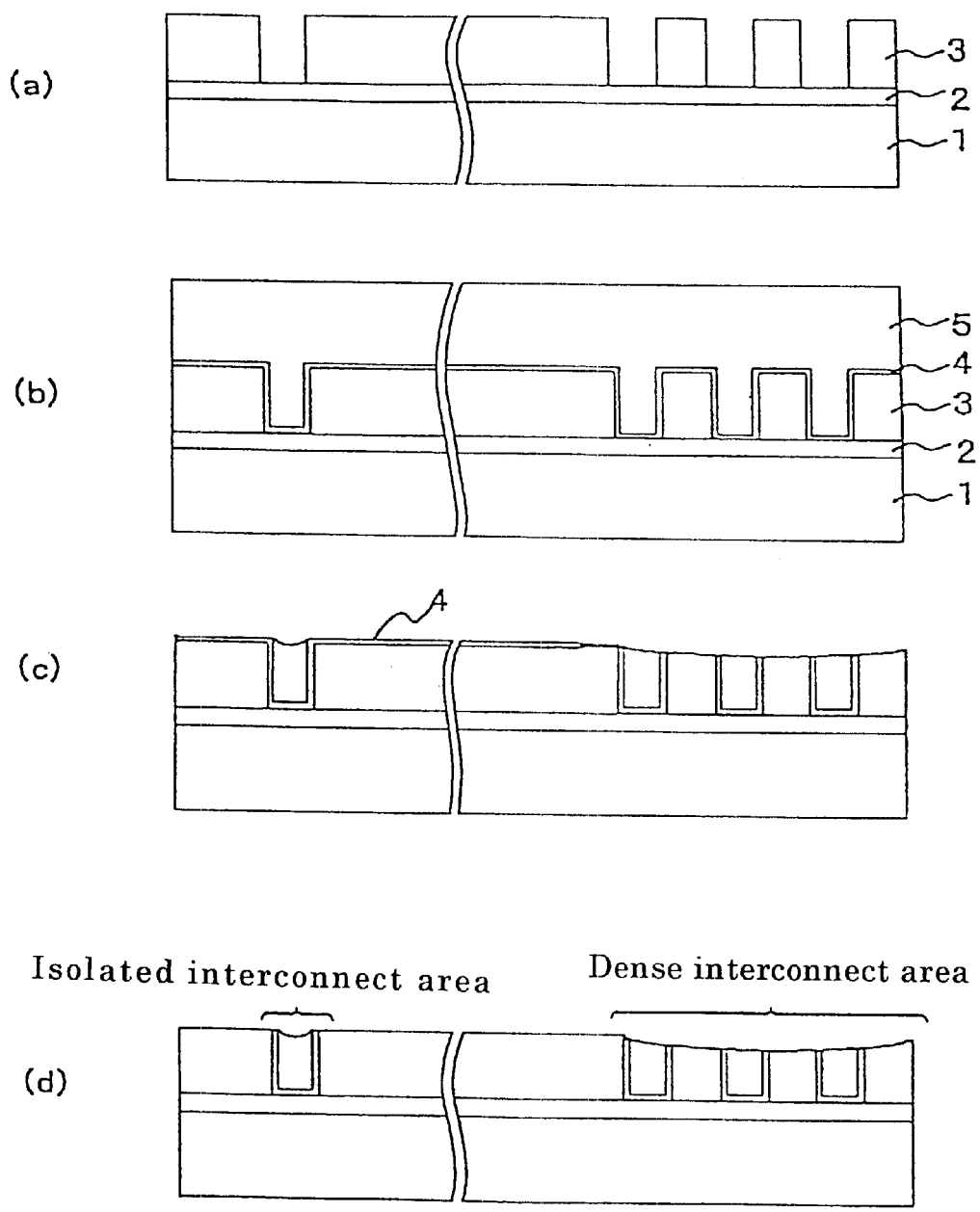
FIGS. 1(a) to 1(d) are process cross sections illustrating a conventional process for forming a damascene copper interconnect.
Figure 2:
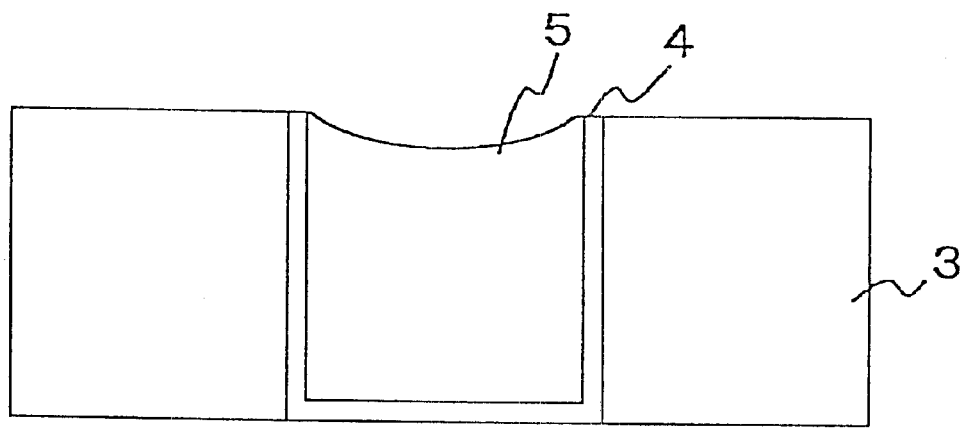
FIG. 2 schematically shows a cross-sectional shape of an interconnect when a damascene copper interconnect is formed using a conventional chemical mechanical polishing slurry.

Preferable embodiments of this invention will be described.

A polishing slurry of this invention comprises a polishing material, an oxidizing agent, a thickener and water. It is preferable to add a proton donor as an oxidation aid for promoting oxidation of a metal film by the oxidizing agent and achieving stable polishing. Furthermore, it is preferable to add an antioxidant for preventing excessive etching by chemical action of the polishing slurry.

Examples of a polishing material which may be used in this invention include alumina such as α-alumina and θ-alumina; silica such as fumed silica and colloidal silica; titania; zirconia; germania; ceria; and a combination of two or more selected from these metal oxide polishing grains.

Among these, alumina or silica is preferable although when a mixture of polishing materials is used, it is preferable to blend those in which a charge on a grain surface has the same sign.

An average particle size of a polishing material is preferably 5 nm or more, more preferably 10 nm or more and preferably 500 nm or less, more preferably 300 nm or less, as determined by light scattering diffraction in the light of, for example, a polishing rate, dispersion stability and surface roughness of a polished surface.

A content of a polishing material in a polishing slurry may be appropriately selected within a range of 0.1 to 50 wt % to the total amount of the polishing slurry in the light of various factors such as a polishing efficiency and polishing accuracy. It is preferably 1 wt % to 10 wt % both inclusive.

An oxidizing agent used in this invention may be appropriately selected from water-soluble oxidizing agents in the light of various factors such as polishing accuracy and a polishing efficiency. For example, those which may not cause heavy-metal ion contamination include peroxides such as $H_2O_2$, $Na_2O_2$, $Ba_2O_2$ and $(C_6H_5C)_2O_2$; hypochlorous acid (HClO); perchloric acid; nitric acid; ozone water; and organic acid peroxides such as peracetic acid and nitrobenzene. Among these, hydrogen peroxide ($H_2O_2$) is preferable because it does not contain a metal component and does not generate a harmful byproduct.

A content of the oxidizing agent in the polishing slurry of this invention is preferably at least 0.01 wt %, more preferably at least 0.05 wt %, further preferably at least 0.1 wt % for achieving adequate effects of its addition while it is preferably 15 wt % or less, more preferably 10 wt % or less for preventing dishing and adjusting a polishing rate to a proper value. When using an oxidizing agent which is relatively susceptible to deterioration with age such as hydrogen peroxide, it may be possible to separately prepare a solution containing an oxidizing agent at a given concentration and a composition which provides a given polishing slurry after addition of the solution containing an oxidizing agent, which are then combined just before use.

A thickener in this invention must be a compound without an ionic group with an opposite sign to a charge on a polishing material grain surface. If a compound with an ionic group with an opposite sign to a charge on the surface of a polishing material grain is used as a thickener, the thickener is adsorbed in a polishing grain surface so that desired thickening effect cannot be achieved or the slurry may tend to be gelled, i.e., a desired polishing slurry cannot be obtained.

When using alumina as a polishing material, a cationic or nonionic thickener because the surface of an alumina particle is positively charged, although when adding an anionic dispersing agent for improving dispersibility of the alumina polishing material in the slurry it is preferable to use a nonionic thickener for preventing a dispersed system from being broken. When adding a dispersing agent, its content is generally 0.05 wt % to 0.5 wt % both inclusive to the total amount of the polishing slurry.

When using silica as a polishing material, an anionic or nonionic thickener can be used because the surface of a silica particle is negatively charged. An anionic thickener is particularly preferable. Since a silica polishing material, in particular fumed silica or colloidal silica, exhibits so good dispersibility that it can dispense with a dispersing agent, a satisfactory polishing slurry can be prepared without using a dispersing agent.

A content of the thickener in this invention must be 0.001 wt % or more and less than 0.05 wt %. It is preferably 0.002 wt % or more, more preferably 0.005 wt % or more while being preferably 0.02 wt % or less, more preferably 0.015 wt % or less. If a content of the thickener is too small, dishing or erosion cannot be desirably prevented, while a too large content may lead to an inadequate polishing rate.

A viscosity of a polishing slurry after adding a thickener must be 1 mPa·s to 5 mPa·s both inclusive. It is preferably 1.5 mPa·s to 4 mPa·s both inclusive. If a slurry viscosity is too low, dishing or erosion cannot be desirably prevented, while a too high slurry viscosity may lead to an inadequate polishing rate.

Examples of a thickener in this invention include surfactants and water-soluble polymers, which may be anionic, cationic or nonionic depending on a surface charge in a polishing material particle used.

Examples of an anionic surfactant which may be used include soluble salts such as sulfonates, sulfates, carboxylates, phosphates and phosphonates, which may be an alkali metal, alkaline-earth metal, ammonium or amine salts, preferably an ammonium salt; for example, alkylsulfates such as alkylbenzenesulfonates and dodecylsulfates; aliphatic acid salts such as stearates; polycarboxylates; alkylphosphates and hexametaphosphates.

Cationic surfactants include amine salts containing a salt-forming primary, secondary or tertiary amine and their modified salts; onium compounds such as quaternary ammonium, phosphonium and sulfonium salts; circular nitrogen-containing compounds and heterocyclic compounds such as pyridinium, quinolinium and imidazolinium salts; for example, lauryl-trimethyl-ammonium chloride, cetyl-trimethyl-ammonium chloride (CTAC), cetyl-trimethyl-ammonium bromide (CTAB), cetyl-dimethyl-benzyl-ammonium bromide, cetylpyridinium chloride, dodecylpyridinium chloride, alkyl-dimethyl-chlorobenzyl-ammonium chloride and alkyl-naphthalene-pyridinium chloride.

Nonionic surfactants include ethylene-oxide condensation surfactants prepared by addition polymerization of ethylene oxide, including ethers such as polyoxyethylene alkyl ethers and polyoxyethylene alkylphenyl ethers; ether esters such as polyethyleneglycerol fatty acid esters; and esters such as polyethyleneglycol fatty acid esters; specifically, POE (10) monolaurate, POE (10, 25, 40, 45 or 55) monostearate, POE(21 or 25) lauryl ether, POE(15, 20, 23, 25, 30 or 40) cetyl ether, POE(20) stearyl ether, POE(2, 3, 5, 7, 10, 15, 18 or 20) nonyl phenyl ether wherein POE represents polyoxyethylene and a number in parentheses is a molar number of ethylene oxide added.

Anionic water-soluble polymers which may be used include polycarboxylate water-soluble polymers; for example, polyacrylate water-soluble polymers such as polyacrylic acid and its salts and acrylic acid-(meth)acrylate copolymers and their salts; alginates; and cellulose derivatives such as carboxymethylcellulose. Nonionic water-soluble polymers which may be used include cellulose derivatives such as hydroxyethylcellulose; polyvinyl alcohol; polyvinylpyrrolidone; polyethylene glycol; and polyacrylamide.

A cationic water-soluble polymer may be polyethyleneimine.

When using a water-soluble polymer, it is preferably selected from those with a proper molecular weight as appropriate. If its molecular weight is too small, a desired level of thickening effect cannot be manifested so that dishing or erosion cannot be adequately prevented. If its molecular weight is too large, an adequate polishing rate cannot be achieved or its solubility may be reduced so that a polishing slurry is hard to be prepared. A molecular weight of the water-soluble polymer, in particular a polyacrylate polymer, is preferably 10000 or more, more preferably 50000 or more, further preferably 100000 or more, while being preferably 5000000 or less, more preferably 2000000 or less.

A proton donor (oxidation aid) added for promoting oxidation by an oxidizing agent in a polishing slurry or for stable polishing may include known organic acids such as known carboxylic acids and amino acids.

Examples of a carboxylic acid include oxalic acid, malonic acid, tartaric acid, malic acid, glutaric acid, citric acid, maleic acid, formic acid, acetic acid, propionic acid, butyric acid, valeric acid, acrylic acid, lactic acid, succinic acid, nicotinic acid and their salts.

An amino acid may be added as such, as a acid, as a salt or as a hydrate. Examples of those which may be added include arginine, arginine hydrochloride, arginine picrate, arginine flavianate, lysine, lysine hydrochloride, lysine dihydrochloride, lysine picrate, histidine, histidine hydrochloride, histidine dihydrochloride, glutamic acid, glutamic acid hydrochloride, sodium glutaminate monohydrate, glutamine, glutathione, glycylglycine, alanine, β-alanine, γ-aminobutyric acid, ε-aminocaproic acid, aspartic acid, aspartic acid monohydrate, potassium aspartate, potassium aspartate trihydrate, tryptophan, threonine, glycine, cystine, cysteine, cysteine hydrochloride monohydrate, oxyproline, isoleucine, leucine, methionine, ornithine hydrochloride, phenylalanine, phenylglycine, proline, serine, tyrosine and valine.

The above organic acids such as carboxylic acids and amino acids may be a mixture of different two or more thereof.

A content of an organic acid in a polishing slurry is preferably at least 0.01 wt %, more preferably at least 0.05 wt % to the total amount of the polishing slurry for achieving adequate effect of its addition as a proton donor, while it is preferably 5 wt % or less, more preferably 3 wt % or less for preventing dishing and adjusting a polishing rate to a proper value. When combining two or more organic acids, the above content refers to the sum of the individual organic acids.

When adding an oxidizing agent in a polishing slurry of this invention, it is preferable to further add an antioxidant. Addition of an antioxidant may facilitate adjustment of a polishing rate of a conductive metal film and allow dishing to be adequately prevented.

Examples of an antioxidant include benzotriazole, 1,2,4-triazole, benzofuroxane, 2,1,3-benzothiazole, o-phenylenediamine, m-phenylenediamine, cathechol, o-aminophenol, 2-mercaptobenzothiazole, 2-mercaptobenzimidazole, 2-mercaptobenzoxazole, melamine and their derivatives. Among these, benzotriazole and its derivatives are preferable. Examples of a benzotriazole derivative include substituted benzotriazoles having a benzene ring substituted with hydroxy; alkoxy such as methoxy and ethoxy; amino; nitro; alkyl such as methyl, ethyl and butyl; halogen such as fluorine, chlorine, bromine and iodine. Examples of a 1,2,4-triazole derivative include a substituted 1,2,4-triazole having any of the substituents as described above in its 5-membered ring.

A content of the antioxidant is preferably at least 0.0001 wt %, more preferably at least 0.001 wt % to the total amount of the polishing slurry for achieving adequate effects of its addition, while it is preferably 5.0 wt % or less, more preferably 2.5 wt % or less for adjusting a polishing rate to a proper value.

For a polishing slurry of this invention, pH is preferably 3 or more, more preferably 4 or more while being preferably 9 or less, more preferably 8 or less in the light of a polishing rate, corrosion, a slurry viscosity and dispersion stability of a polishing material. A known procedure may be used to adjust pH of a polishing slurry, using an alkali such as alkali metal hydroxides such as sodium hydroxide and potassium hydroxide; alkali metal carbonates such as sodium carbonate and potassium carbonate; ammonia; and amines.

A polishing slurry of this invention may contain a variety of additives such as dispersing agents and buffers commonly added to a polishing slurry as long as it does not deteriorate the properties of the slurry.

A composition ratio of a polishing slurry of this invention is preferably adjusted such that a polishing rate for a metal film by CMP becomes preferably at least 400 nm/min, more preferably at least 500 nm/min. A composition ratio is preferably adjusted such that the polishing rate becomes preferably 1500 nm/min or less, more preferably 1000 nm/min or less in the light of polishing accuracy and prevention of dishing.

A polishing slurry of this invention may be prepared by a common process for preparing a free-grain aqueous polishing slurry composition. Specifically, to an aqueous solvent are added a proper amount of polishing grain (polishing material particles) and, if necessary, a proper amount of a dispersing agent. In such a state, the grains are aggregated. Thus, the aggregated polishing material particles are dispersed into particles with a desired particle size by conducting dispersion of the polishing grain mixture. In such a dispersion process, an appropriate apparatus may be used, including an ultrasonic disperser, a bead mill, a kneader and a ball mill. A thickener in this invention may be added before or after the dispersion process.

CMP using a polishing slurry of this invention may be conducted, using, for example a procedure described below. First, a substrate is prepared, on which an insulating film is formed, a concave with a given pattern is formed on the insulating film and a metal film is deposited on the concave. The substrate is placed on a wafer carrier such as a spindle. The metal film surface of the substrate is contacted with a polishing pad attached on a surface plate such as a rotary plate, under a given pressure. While supplying a polishing slurry between the substrate and the polishing pad, polishing is initiated by relatively moving the substrate (wafer) and the polishing pad (e.g., rotating both). The polishing slurry may be supplied on the polishing pad from a separate supply pipe or from the surface plate side. If necessary, a pad conditioner is contacted with the surface of the polishing pad to condition the surface of the polishing pad.

A polishing slurry of this invention described above may be most effectively used when polishing by CMP is conducted to a substrate in which a barrier metal film is deposited on an insulating film comprising a concave such as a trench and a connection hole and a conductive metal film is formed over the whole surface while filling the concave with the metal, to form an electric connection such as a damascene interconnect, a via plug and a contact plug. Examples of an insulating film include a silicon oxide film, a BPSG film and an SOG film. Examples of a conductive metal film include those made of copper, silver, gold, platinum, titanium, tungsten, aluminum and alloys thereof. Examples of a barrier metal film include those made of a tantalum-based metal such as tantalum (Ta), tantalum nitride and tantalum nitride silicon; a titanium-based metal such as titanium (Ti) and titanium nitride; a tungsten-based metal such as tungsten (W), tungsten nitride and tungsten nitride silicon. Among others, a polishing slurry of this invention may be more effectively used when a conductive metal film is a copper-based metal film (a copper film or a copper alloy film comprising copper as a main component). In particular, the slurry may be effectively used when the conductive metal film is a copper-based metal film and the barrier metal film is a tantalum-based metal film.

EXAMPLE

This invention will be more specifically described with reference to Examples.

Substrate to be Polished

A substrate to be polished where a metal film is formed on an insulating film comprising a concave was prepared as described below. On a 6 inch wafer (silicon substrate) in which a semiconductor device such as a transistor was formed was deposited a lower interconnect layer made of a silicon oxide film comprising a lower interconnect. On the lower interconnect layer was formed a silicon nitride film, on which was formed a silicon oxide film to about 500 nm. The silicon oxide film was patterned by photolithography and reactive ion etching to form a trench for interconnection and a connection hole with a width of 0.23 μm to 10 μm and a depth of 500 nm. Then, a Ta film was formed to 50 nm by sputtering, a copper film was formed to 50 nm by sputtering, and then a copper film was formed to about 800 nm by plating.

CMP Conditions

CMP was conducted using a Speedfam-Ipec Type SH-24 apparatus. The polisher was used, on whose surface plate a polishing pad (Rodel-Nitta IC 1400) was attached. Polishing conditions were as follows: a polishing load (a contact pressure of the polishing pad): 27.6 kPa; a rotating speed of the surface plate: 55 rpm; a carrier rotating speed: 55 rpm; and a polishing slurry feeding rate: 100 mL/min.

Determination of a Polishing Rate

A polishing rate was estimated from surface resistivity values before and after polishing. Four needle electrodes were aligned on a wafer with a given interval. A given current was applied between the outer two probes to detect a potential difference between two inner probes for determining a resistance (R') and further the value is multiplied by a correction factor RFC (Resistivity Correction Factor) to a surface resistivity (ρs'). A surface resistivity (ρs) is determined for a wafer film whose thickness (T) (nm) is known. The surface resistivity is inversely proportional to the thickness. Thus, when a thickness for a surface resistivity of ρs' is d, an equation:

$$d(nm)=(\rho s \times T)/\rho s'$$

holds true. Using the equation, the thickness d can be determined. Furthermore, a variation between before and after polishing was divided by a polishing time to estimate a polishing rate. A surface resistivity was determined using Four Probe Resistance Detector (Mitsubishi Chemical Industries, Loresta-GP).

Determination of a Slurry Viscosity

A viscosity of a polishing slurry was determined by measuring a shearing stress using a rotating viscometer (HAAKE Inc., Rotovisco RV20) at 25° C. while varying a shearing rate from 0 to 1000 [1/sec].

Evaluation of Dishing and Erosion

Steps were measured by tracing an interconnect-forming area on a polished wafer surface with a stylus. Using HRP-100 (KLA Tencol Inc.) as a step measuring apparatus, scanning was conducted from an area where an interconnect was not formed on an interlayer insulating film, through an interconnect or dense interconnect area, to the opposite side of the interlayer insulating film.

Examples 1 to 3 and Comparative Example 1

Polishing slurries were prepared, which comprised 5 wt % of θ-alumina with an average particle size of 50 nm, 5 wt % of hydrogen peroxide solution (concentration: 30 wt %), 0.5 wt % of citric acid, 1 wt % of glycine, 0.01 wt % of benzotriazole and 0.01 wt % of a thickener below.

Thickeners were POE (10) nonyl phenyl ether (an nonionic surfactant), lauryl-trimethyl-ammonium chloride (a cationic surfactant) and hydroxyethylcellulose (a water-soluble polymer) for Examples 1, 2 and 3, respectively.

The measurement results for the above Examples are shown in Table 1 together with the results for a polishing slurry prepared as described in the above Examples except that a thickener was not added (Comparative Example 1). The results indicate that according to this invention, a dishing level can be reduced to about a half or less without significantly reducing a polishing rate.

TABLE 1

|  | Viscosity (mPa · s) | Polishing rate (nm/min) | Dishing level (nm) |
| --- | --- | --- | --- |
| Example 1 | 2.0 | 595 | 39 |
| Example 2 | 2.0 | 565 | 38 |
| Example 3 | 3.5 | 550 | 23 |
| Comparative Example 1 | 1.5 | 580 | 75 |

Examples 4 to 9 and Comparative Example 2

Polishing slurries were prepared, which comprised 3 wt % of colloidal silica with an average particle size of 20 nm, 5 wt % of hydrogen peroxide solution (concentration: 30 wt %), 2 wt % of glycine, 0.3 wt % of 1,2,4-triazole and 0.01 wt % of a thickener below.

A thickener was ammonium polyacrylate which was an anionic water-soluble polymer, with a molecular weight shown in Table 2. Its molecular weight was a weight average molecular weight (Mw) determined by GPC under the conditions: column: SHODEX GF-7MHQ; detector: UV (wavelength 214 nm); eluent: 0.1% sodium phosphate solution (pH 7); flow rate: 0.5 mL/min; temperature: 35° C.; standard: polyacrylic acid standard (Sowa Kagaku Ltd.).

The measurement results for the above Examples are shown in Table 2 together with the results for a polishing slurry prepared as described in the above Examples except that a thickener was not added (Comparative Example 2). The results indicate that according to this invention, a dishing level can be reduced to a half or less without reducing a polishing rate.

TABLE 2

|  | Molecular weight | Viscosity (mPa · s) | Polishing rate (nm/min) | Dishing level (nm) |
| --- | --- | --- | --- | --- |
| Example 4 | 50000 | 1.4 | 472 | 14 |
| Example 5 | 100000 | 1.5 | 470 | 14 |
| Example 6 | 200000 | 1.7 | 484 | 11 |
| Example 7 | 800000 | 2.0 | 587 | 10 |
| Example 8 | 1200000 | 2.8 | 546 | 12 |
| Example 9 | 5000000 | 4.5 | 485 | 15 |
| Comparative Example 2 | — | 1.3 | 466 | 30 |

Example 10 and Comparative Example 3

Polishing slurries were prepared as described in Example 7, except a content of a thickener was selected from those shown in Table 3. Measurement results for the slurries are shown in Table 3 together with those for Comparative Example 2 and Example 7. The results indicate that an excessive amount of a thickener significantly reduce a polishing rate.

TABLE 3

|  | Thickener Content (wt %) | Viscosity (mPa · s) | Polishing rate (nm/min) |
| --- | --- | --- | --- |
| Example 10 | 0.005 | 1.5 | 510 |
| Example 7 | 0.01 | 2.0 | 587 |
| Comparative Example 3 | 0.10 | 6.5 | 160 |
| Comparative Example 2 | 0 | 1.3 | 466 |

Example 11 and Comparative Example 4

A polishing slurry was prepared, which comprised 3 wt % of colloidal silica with an average particle size of 30 nm, 5 wt % of hydrogen peroxide solution (concentration: 30 wt %), 2 wt % of glycine, 0.3 wt % of 1,2,4-triazole and 0.01 wt % of ammonium polyacrylate (Mw: 800000) as a thickener (Example 11). Another polishing slurry was prepared as described above except a thickener was not used (Comparative Example 4).

CMP was conducted to a substrate to be polished using these polishing slurries. An erosion level in a dense interconnect area (interconnect width/space width=4 μm /1 μm) was 80 nm in Comparative Example 4 while was reduced to 50 nm in Example 11. A dishing level in an isolated interconnect with a width of 10 μm was 80 nm in Comparative Example 4 while being reduced to 55 nm in Example 11.

What is claimed is:

1. A chemical mechanical polishing slurry adapted to polish a metal film on an insulating film on a substrate, the insulating film having at least one concavity, wherein said slurry comprises a polishing material having a surface charge and 0.001 wt. % or more to less than 0.05 wt. % based on the total weight of the slurry of a thickener without an ionic group with an opposite sign to the charge on the polishing material surface, wherein the slurry has a viscosity of 1 to 5 mPa·s, and wherein the thickening agent is a surfactant or a water soluble polymer.

2. The chemical mechanical polishing slurry as claimed in claim 1 in which the polishing material is a particulate having an average particle size of 5 to 500 nm and is present in an amount of 0.1 to 50 wt. %.

3. The chemical mechanical polishing slurry as claimed in claim 2, which the slurry contains 0.01 to 15 wt. % of an oxidizing agent, 0.01 to 5 wt. % of an organic acid, 0.0001 to 5 wt. % of an antioxidant and wherein the slurry has a pH of 3 to 9.

4. The chemical mechanical polishing slurry as claimed in claim 2 in which the thickener is 0.002 to 0.02 wt. % and the slurry viscosity is 1.5 to 4 mPa·s.

5. The chemical mechanical polishing slurry as claimed in 4 in which the polishing material has an average particle size of 10 to 300 nm and constitutes 1 to 10 wt. % of this slurry and wherein the thickener is 0.005 to 0.015 wt. % of the slurry.

6. The chemical mechanical polishing slurry as claimed in claim 5 wherein the slurry has a polishing rate of 400 to 1500 nm/m.

7. The chemical mechanical polishing slurry as claimed in claim 6 wherein the slurry has a polishing rate of 500 to 1000 nm/M.

8. The chemical mechanical polishing slurry as claimed in claim 7 in which the slurry contains 0.01 to 15 wt. % of an oxidizing agent, 0.01 to 5 wt. % of an organic acid, 0.0001 to 5 wt. % of an antioxidant and wherein the slurry has a pH of 3 to 9.

9. The chemical mechanical polishing slurry of claim 8 in which the oxidizing agent is hydrogen peroxide and is present in an amount of 0.05 to 10 wt. %, the organic acid is 0.05 to 3 wt. %, the anti-oxidant is 0.001 to 2.5 wt. % and the pH of the slurry is 4 to 8.

10. The chemical mechanical polishing slurry as claimed in claim 9 in which the polishing material is alumina and the thickener is a non-ionic or cationic surfactant or a water soluble polymer.

11. The chemical mechanical polishing slurry as claimed in claim 10 in which the thickener is a non-ionic surfactant or a water soluble polymer and the slurry contains an anionic dispersing agent.

12. The chemical mechanical polishing slurry as claimed in claim 9 in which the polishing material is silica particles and the thickener is an anionic surfactant or a water soluble polymer.

13. The chemical mechanical polishing slurry as claimed in claim 12 in which the thickener is an anionic surfactant and the slurry is free of dispersing agent for dispersing the polishing material particles.

14. The chemical mechanical polishing slurry as claimed in claim 9 in which the polishing material is silica particles and the thickener is a water soluble polycarboxylate polymer.

15. The chemical mechanical polishing slurry as claimed in claim 1 in which the polishing material is alumina and the thickener is a non-ionic or cationic surfactant or a water soluble polymer.

16. The chemical mechanical polishing slurry as claimed in claim 1 in which the thickener is a non-ionic surfactant or a water soluble polymer and the slurry contains an anionic dispersing agent.

17. The chemical mechanical polishing slurry as claimed in claim 1 in which the polishing material is silica particles and the thickener is an anionic surfactant or a water soluble polymer.

18. The chemical mechanical polishing slurry as claimed in claim 1 in which the thickener is an anionic surfactant and the slurry is free of dispersing agent for dispersing the polishing material particles.

19. The chemical mechanical polishing slurry as claimed in claim 1 in which the polishing material is silica particles and the thickener is a water soluble polycarboxylate polymer.

\* \* \* \* \*